United States Patent [19]

Wake et al.

[11] Patent Number: 5,323,398
[45] Date of Patent: Jun. 21, 1994

[54] TRANSMISSION SYSTEM FOR TRANSMITTING G3 FACSIMILE SIGNALS AND COMPRESSED SPEECH SIGNALS

[75] Inventors: Yasuhiro Wake; Katsunori Usuki, both of Tokyo, Japan

[73] Assignee: NEC Corporation, Japan

[21] Appl. No.: 966,132

[22] Filed: Oct. 23, 1992

[30] Foreign Application Priority Data

Oct. 24, 1991 [JP] Japan .................................. 3-305363

[51] Int. Cl.⁵ .............................................. H04J 3/00
[52] U.S. Cl. .................. 370/110.1; 370/112; 379/100; 358/434
[58] Field of Search .................. 370/110.1, 112, 94.1, 370/94.2; 379/100; 358/434, 438

[56] References Cited

U.S. PATENT DOCUMENTS

| | | | |
|---|---|---|---|
| 4,876,696 | 10/1989 | Yoshikawa | 375/5 |
| 4,995,073 | 2/1991 | Okata et al. | 370/110.1 |
| 5,042,028 | 8/1991 | Ogawa | 370/110.1 |
| 5,050,005 | 9/1991 | Kagami | 358/434 |
| 5,117,453 | 5/1992 | Piasecki et al. | 379/100 |
| 5,136,634 | 8/1992 | Rae et al. | 370/110.1 |

Primary Examiner—Douglas W. Olms
Assistant Examiner—Min Jung
Attorney, Agent, or Firm—Ostrolenk, Faber, Gerb & Soffen

[57] ABSTRACT

A speech signal coding system including a speech signal encoder for dividing received speech signals into a plurality of frames each having a predetermined time interval and for converting the speech signals into digital speech parameters. The system includes a multiplexer for multiplexing the output digital data from the speech signal encoder into a predetermined frame format; a control frame generator for generating, in response to an inputted facsimile signal, a control frame having speech data frame configuration for identifying a facsimile signal identification data indicating the input signal as the facsimile signal. A facsimile signal demodulator converts the facsimile signal into digital data and a bit-synchronous multiplexer multiplexes the digital data. An output device outputs the speech data frame of the multiplexer to a digital transmission line and further outputs, when a facsimile signal is input, the control frame and facsimile data multiplexed as the bit synchronous data onto the digital transmission line.

3 Claims, 3 Drawing Sheets

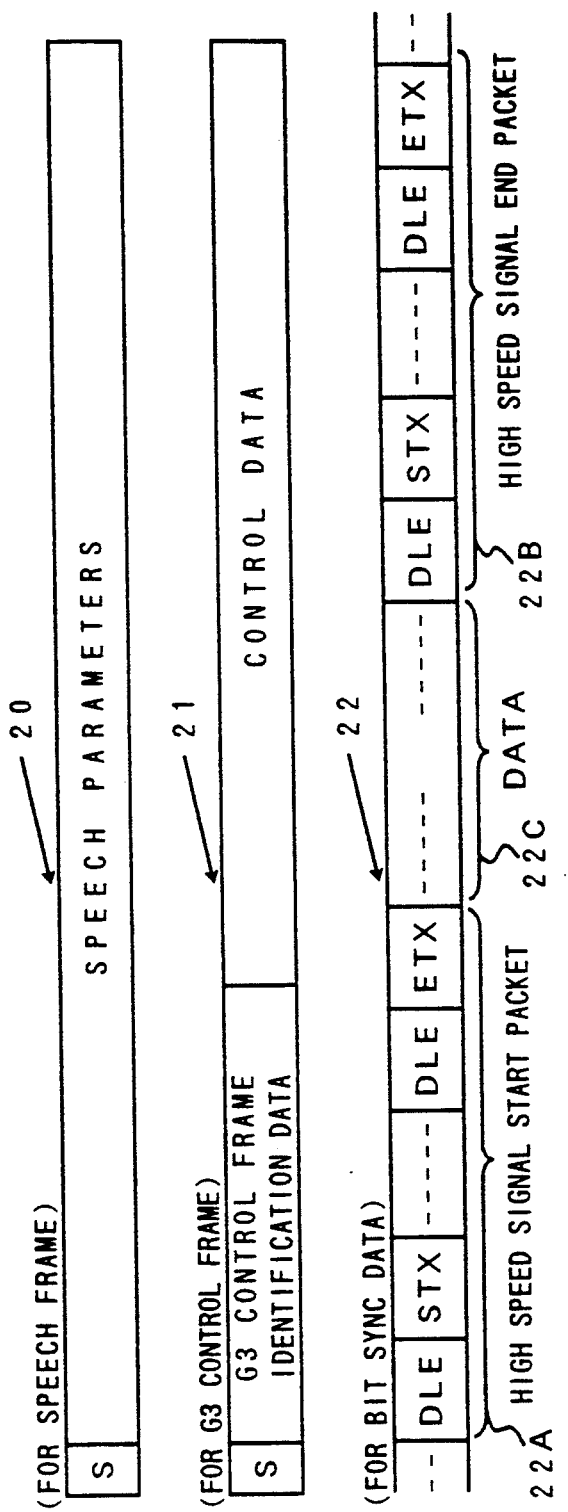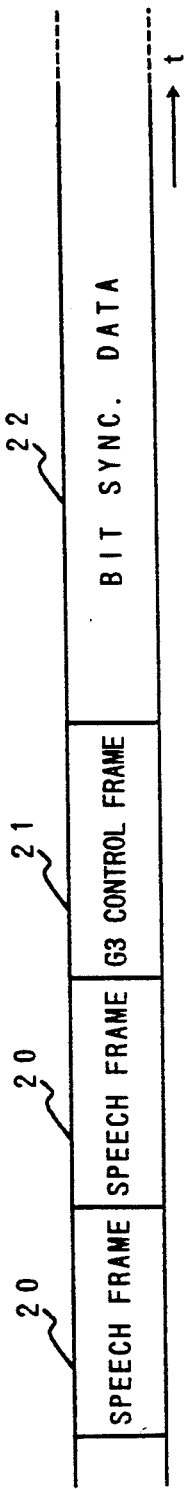

FIG. 4

(FOR SPEECH FRAME)

| S | SPEECH PARAMETERS |

(FOR G3 FACSIMILE LOW SPEED FRAME)

| S | G3 FACSIMILE IDENTIFICATION DATA | G3 FACSIMILE LOW SPEED DATA |

(FOR G3 FACSIMILE HIGH SPEED FRAME)

| S | G3 FACSIMILE IDENTIFICATION DATA | G3 FACSIMILE HIGH SPEED DATA |

5,323,398

TRANSMISSION SYSTEM FOR TRANSMITTING G3 FACSIMILE SIGNALS AND COMPRESSED SPEECH SIGNALS

BACKGROUND OF THE INVENTION

The present invention relates to a speech signal coding and decoding systems and, more particularly, to a highly efficient speech signal coding and decoding system which transmits compressed speech signals in the form of a plurality of speech parameters and G3 facsimile signals by time divisional transmission over the same transmission line.

With recent spread of exclusive digital data transmission lines, there are prosperous attempts by enterprises to construct exclusive internal digital networks, and the speech signal coding and decoding systems with lower bit rates has been progressed from the standpoint of the economy of digital data transmission lines. However, to reduce the bit rate in the coding of speech signals without quality sacrifice therein, it is necessary to code the speech signals by taking features thereof into considerations, causing problems in the proper transmission of facsimile signals, which are non-speech signals. In other words, it is difficult to construct a network without taking telephone/facsimile features into considerations.

U.S. Pat. No. 4,876,696 discloses a technique for solving the above problem. In the disclosed technique, the at coding side provided are a speech signal encoder, and a G3 facsimile signal demodulator for converting G3 facsimile signal into digital data. Thus, when the G3 facsimile signals is input, the input signals are converted by the G3 facsimile signal demodulator into the digital data and transmitted. Similarly, at the decoding side provided are a speech signal decoder, and a G3 facsimile signal modulator. When G3 facsimile data is received as digital data, it is converted by the G3 facsimile modulator into a modem signal. In this way, the transmission of G3 facsimile signals is realized.

FIG. 4 shows data frame formats in this technique. The frame of speech data comprises a frame sync signal S provided at the start and following speech signal parameter data obtained as a result of highly efficient coding of speech signal. For G3 facsimile data, there are two different frames, i.e., a low speed frame and a high speed frame. The low speed frame comprises a head frame sync signal provided at the start, then G3 facsimile frame identification data indicative of the G3 facsimile data frame, and then G3 facsimile low speed data. Likewise, the high speed frame comprises a head frame sync signal, G3 facsimile identification data, and G3 facsimile high speed data.

In this prior art system, speech signals is divided into a plurality of frames each having a constant time interval and transmitted by frame-by-frame transmission. Therefore, it is necessary to provide an overhead in the frame, the overhead including a frame sync bit for establishing the frame synchronization, identification information representing whether the frame data is speed parameter data or G3 facsimile data, kind of G3 facsimile data (i.e., either CCITT V21 or V29/V27 ter) and information indicative of the number of data pieces. That is, it is inevitable to transmit G3 facsimile data in the frame duration without the overhead. This means that 9,600 bps facsimile high speed data, for instance, can not be transmitted over a 9,600 bps line. By way of example, in case of coding speech signals with 16 kbps to produce 20-msec speech data frames, each frame has 320 bits. On the other hand, for facsimile data transmitted in 20-msec frames the number of bits per frame is 192. When using the speech data frame configuration noted above, 320-192, i.e., 128, bits are residual bits. These residual bits are assigned to the above head. However, when coding speech signal with 9.6 kbps for transmission with a frame duration of 20 msec., the number of bits per frame is 192, and the above residual bits can not be secured for assignment to the overhead. This causes the above problems.

SUMMARY OF THE INVENTION

An object of the invention is therefore to provide a speech signal coding and decoding system, which permits transmission of 9,600 bps G3 facsimile data together with speech data by time divisional transmission over a 9,600 bps digital data transmission line.

According to the present invention there is provided a speech signal coding system comprising a speech signal encoder for dividing, when speech signals is input, the input signals into a plurality of frames each having a predetermined time interval and converting the speech signals into digital speech parameters, a multiplexer for multiplexing the output digital data from the speech signal encoder into a predetermined frame format, a control frame generator for generating, in response to the input of a facsimile signal, a control frame having a speech data frame configuration for identifying a facsimile signal identification data, a facsimile signal demodulator for converting the facsimile signal into digital data, a bit synchronous multiplexer for multiplexing the digital data as bit synchronous data, and output means for outputting, when a speech signal is input, a speech data frame as an output of the multiplexer to a digital transmission line, and outputting, when a facsimile signal is input, the control frame and following facsimile data multiplexed as said bit synchronous data to said digital transmission line.

According to the present invention there is also provided a speech signal coding and decoding system comprising:

a speech signal coding system including a speech signal encoder for dividing, when speech signals is input, the input signals into a plurality of frames each having a predetermined time interval and converting the speech signals into digital speech parameters, a multiplexer for multiplexing the output digital data from the speech signal encoder into a predetermined frame format, a control frame generator for generating, in response to the input of a facsimile signal, a control frame having a speech data frame configuration for identifying a facsimile signal identification data, a facsimile signal demodulator for converting the facsimile signal into digital data, a bit synchronous multiplexer for multiplexing the digital data as bit synchronous data, and output means for outputting, when a speech signal is input, a speech data frame as an output of the multiplexer to a digital transmission line, and outputting, when a facsimile signal is input, the control frame and following facsimile data multiplexed as said bit synchronous data to said digital transmission line; and a speech signal decoding system including a frame sync signal detector for detecting a frame sync signal in data received from the digital transmission line, a speech signal decoder for reproducing, when the received data is a speech data frame including speech parameters, the original speech signal by using the speech parameters, processing means for processing, when the received data is the control frame having the speech data frame configuration, the received data following the control frame as bit synchronous data, and a facsimile data modulator for modulating the output of the processing means into a modem signal.

Other objects and features will be clarified from the following description with reference to the attached drawings.

BRIEF DESCRIPTION OF THE DRAWINGS

FIG. 2 shows examples of the formats of the speech frame, G3 control frame and bit synchronous data;

FIG. 3 shows an example of the transmitted data format to the digital transmission line; and FIG. 4 shows examples of the conventional formats of the speech frame, G3 control frame and bit synchronous data.

DESCRIPTION OF THE PREFERRED EMBODIMENT

Figure 1A:
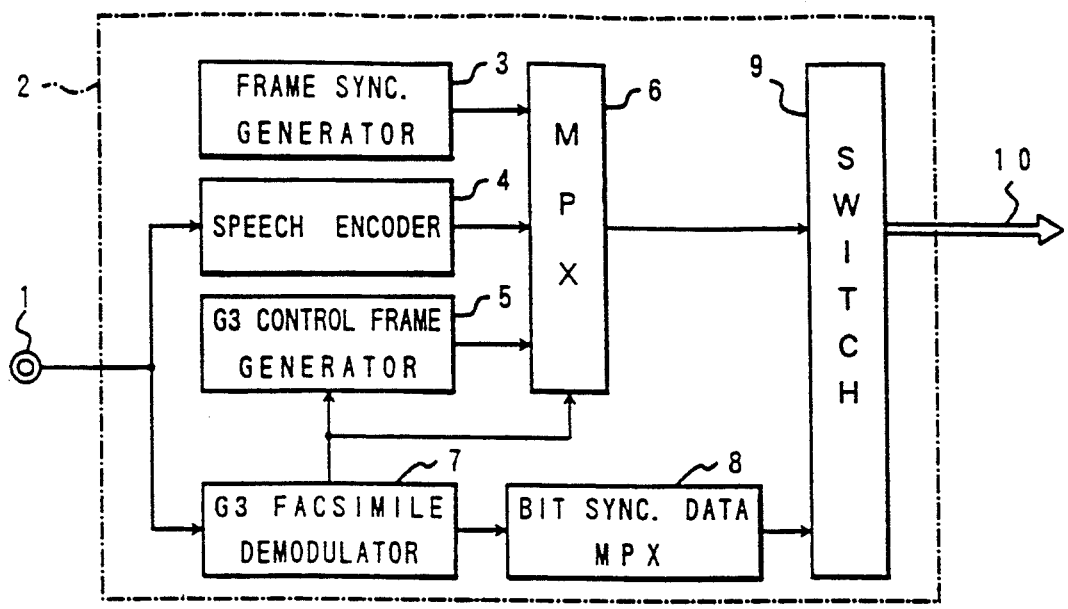
FIG. 1a–1b shows block diagrams of speech coding apparatus and speech coding and decoding apparatus according to the present invention.
Figure 1B:
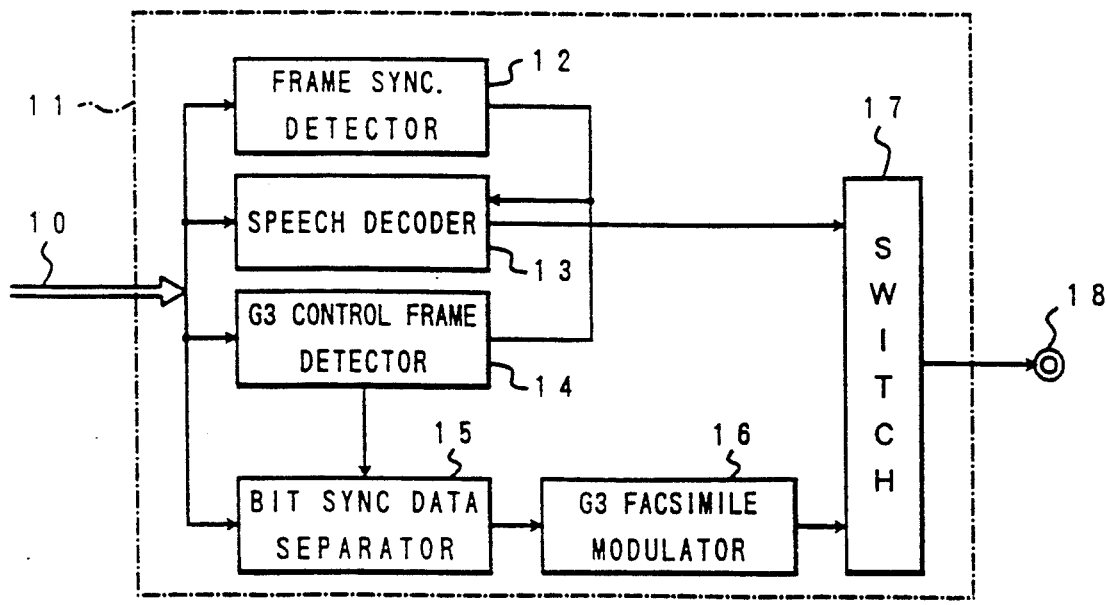

Referring now to FIG. 1, if a signal input to an input terminal 1 of an encoding system 2 is a speech signal, it is coded in a speech signal encoder 4 to obtain speech parameter data, which is fed to a multiplexer 6. The multiplexer 6 multiplexed the input speech parameter data to a predetermined frame format by adding a frame sync bit generated by a frame sync generator 3.

Shown at 20 in FIG. 2 is a speech data frame. This frame comprises a frame sync bit S provided at the start and following speech parameter data. The speech parameter data represents features of the input speech signals coded in the speech signal encoder 4, which is a high efficiency encoder. The high efficiency speech signal encoder may be a multi-pulse coding system (MC). The speech parameter data represents features of the speech signal determined as a result of linear predictive coding (LPC). If the signal input to the input terminal 1 is a G3 facsimile signal, it is converted in a G3 facsimile signal converter into facsimile data fed to a bit sync data multiplexer 8, while at the same time a G3 control frame generator 5 is excited.

The G3 control frame generator 5 generates a G3 control frame 21 as shown in FIG. 2, which is similar configuration to that of the speech data frame 20. The similar frame to the speech data frame means that it is the same in the frame duration and phase. The G3 control frame 21 comprises a frame sync bit provided at the start, then G3 control frame identification information indicative of a G3 control frame and then control data. The control data is indicative of that following digital data is bit synchronous data, and its contents may be predetermined between the transmitting and receiving sides. The frame sync signal S, which is the start or first bit of the G3 control frame, is generated by the frame sync generator 3 and multiplexed in the multiplexer 6 with the G3 control frame identification data generated from the G3 control frame generator 5 and the control data to obtain the frame configuration 21 shown in FIG. 2.

The bit sync data multiplexer 8 generates bit sync data having a format 22. This bit sync data 22 is output by a switch 9 to a line 10 immediately after the G3 control frame 21. As shown in FIG. 2, the bit sync data multiplexer 8 outputs bit sync data 22C by inserting a high speed signal start packet 22A at an the start timing of reception of G3 facsimile high speed signal (CCITT V29, 9,600 bps) and a high speed signal end packet 22B at the end timing of reception of the signal. FIG. 3 shows an example of the transmitted data format to the digital transmission line 10 in case when G3 facsimile data is input after speech data frames 20 including speech signals.

Speech signal and G3 facsimile signal input to the input terminal 1 are discriminated from each other by the G3 facsimile demodulator 7. In the case of G3 facsimile, prior to the transmission of video data (i.e., high speed data) a hand shake between the two facsimile terminals according to V21 signal (indicative of a coding method prescribed by CCITT) is made for determining the method of communication between the terminals. The hand shake has a HDLC (High-level data link control) frame configuration, and for establishing the bit synchronization a preamble signal (i.e., continuous data of 7EH) is transmitted for one second prior to the HDLC data transmission. The G3 facsimile demodulator 7 detects this preamble signal, and if this signal is input continuously for 200 msec., it is determined that the input signal is a G3 facsimile signal.

In a decoding system 11, a frame sync detector 12 detects frame sync signal in digital data received from the digital transmission line 10, and a speech signal decoder 13 and a G3 control frame detector 14 are operated under control of this frame sync signal. If speech parameter data is received, the speech signal decoder 13 decodes the data to reproduce the original speech which is fed to a switch 17. If a G3 control frame is received, it is detected by the G3 control frame detector 14, and a bit synchronous data separator 15 separates bit sync signal succeeding the G3 control frame, thus obtaining G3 facsimile data. When the bit synchronous data separator 15 receives a high speed signal start packet 22A noted above (see FIG. 2), it determines the subsequent data to be high speed signal. When it receives a high speed signal end packet 22B, it determines the data to be ended. The G3 facsimile data separated in the bit synchronous separator 15 is modulated in a G3 facsimile data modulator into a modem signal, which is fed to the switch 17 and thence led to an output terminal.

As has been described in the foregoing, at the transmitted side the G3 facsimile signal is transmitted as the synchronous data after the transmission of a G3 control frame having a speech data frame configuration. Thus, it is possible to transmit 9,600 bps facsimile high speed data along with speech data frame data by time division transmission over a 9,600 bps transmission line.

What is claimed is:

1. A speech signal coding system comprising a speech signal encoder for dividing input speech signals into a plurality of frames each having a predetermined time interval and for converting said speech signals into digital speech parameters, a multiplexer for multiplexing digital data being outputted from said speech signal encoder into a predetermined frame format, a control frame generator for generating, in response to an input of a facsimile signal, a control frame having a speech data frame configuration for indentifying a facsimile signal identification data indicating said input signal as the facsimile signal, a facsimile signal demodulator for converting said facsimile signal into digital data, a bit synchronous multiplexer for multiplexing said digital data converted by said facsimile signal demodulator as bit synchronous data, and output means for outputting, when a speech signal is input, a speech data frame as an output of said multiplexer to a digital transmission line, and outputting, when the facsimile signal is input, said control frame followed by facsimile data multiplexed as said bit synchronous data to said digital transmission line.

2. A speech signal coding and decoding system comprising:

a speech signal coding system including a speech signal encoder for dividing inputted speech signals into a plurality of frames each having a predetermined time interval and for converting said speech signals into digital speech parameters, a multiplexer for multiplexing digital data outputted from said speech signal encoder into a predetermined frame format, a control frame generator for generating, in response to the input of a facsimile signal, a control frame having a speech data frame configuration for identifying a facsimile signal identification data indicating said input signal as the facsimile signal, a facsimile signal demodulator for converting said facsimile signal into digital data, a bit synchronous multiplexer for multiplexing said digital data converted by said facsimile signal demodulator as bit synchronous data, and output means for outputting, when a speech signal is input, a speech data frame as an output of said multiplexer to a digital transmission line, and outputting, when the facsimile signal is input, said control frame followed by facsimile data multiplexed as said bit synchronous data to said digital transmission line, and a speech signal decoding system including a frame sync signal detector for detecting a frame sync signal in data received from said digital transmission line, a speech signal decoder for reproducing the original speech signal by using said speech parameters, when said received data is a speech data frame including speech parameters, processing means for processing, when said received data is said control frame having the speech data frame configuration, the received data following said control frame as bit synchronous data, and a facsimile data modulator for modulating the output of said processing means into a modem signal.

3. A speech signal coding and decoding system comprising:

transmitting coded speech signals as a speech frame when an input signal is speech signals;

transmitting a G3 facsimile data as a bit synchronous data after transmission of a G3 control frame having the same construction as that of the speech frame when said input signal is G3 facsimile signal; and decoding the transmitted data of said coded speech signal data and G3 facsimile data based upon said G3 control frame.

* * * * *